Figure 1:
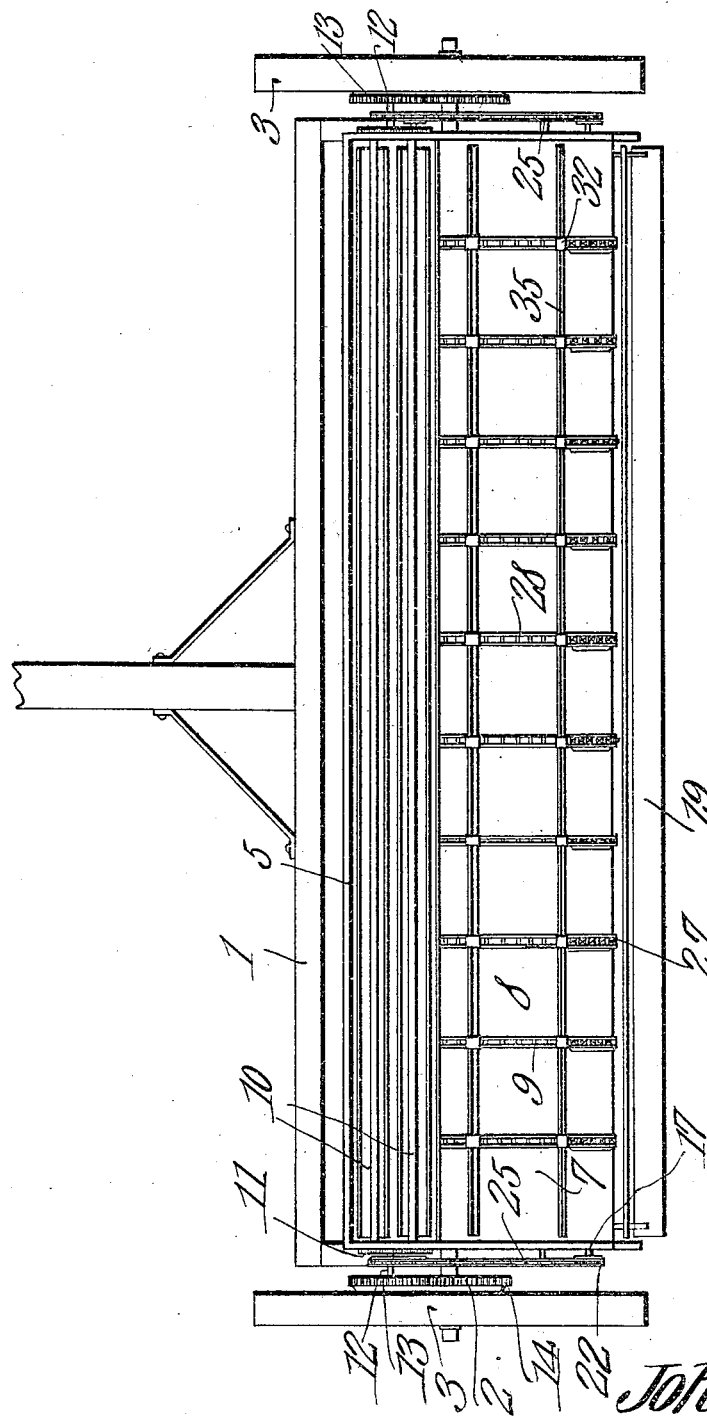

J. L. HICKS.
SEEDER.
APPLICATION FILED JUNE 2, 1909.

951,073.

Patented Mar. 1, 1910.
3 SHEETS—SHEET 1.

Inventor
John L. Hicks.

Witnesses

By C. A. Snow & Co.
Attorneys

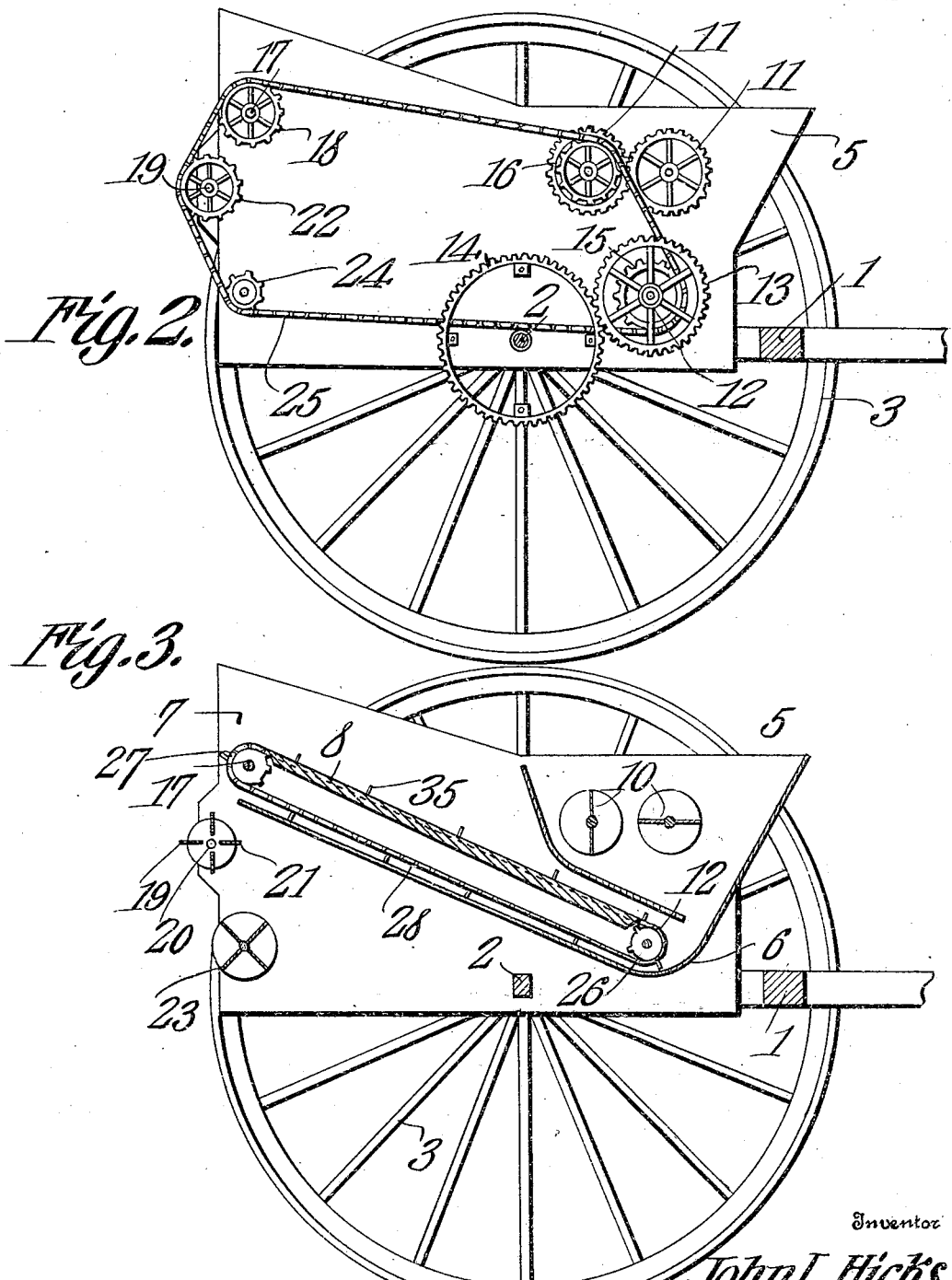

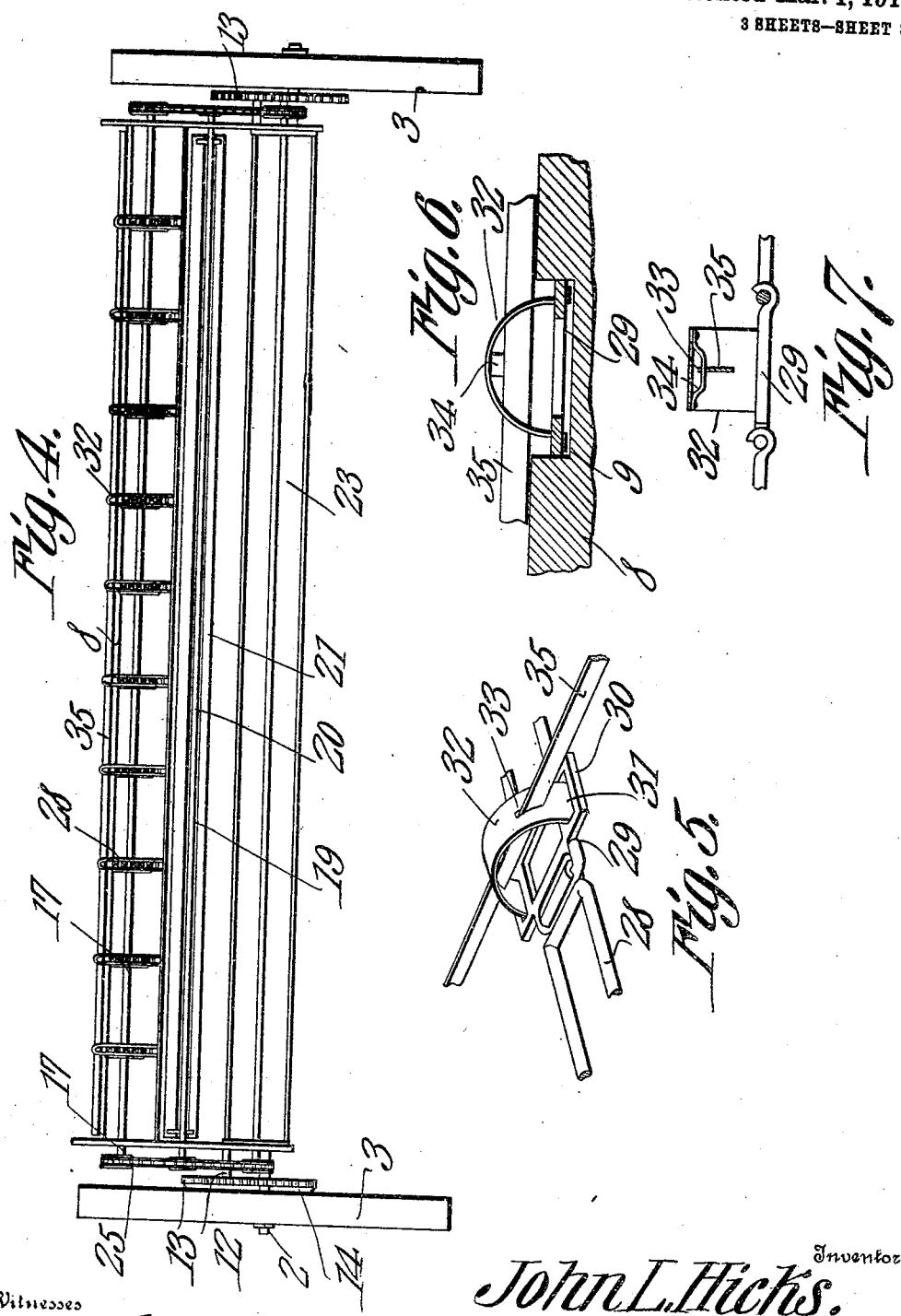

UNITED STATES PATENT OFFICE.

JOHN LOUIS HICKS, OF AUSTIN, KENTUCKY.

SEEDER.

951,073.  Specification of Letters Patent.  Patented Mar. 1, 1910.

Application filed June 2, 1909. Serial No. 499,632.

*To all whom it may concern:*

Be it known that I, JOHN LOUIS HICKS, a citizen of the United States, residing at Austin, in the county of Barren and State of Kentucky, have invented a new and useful Seeder, of which the following is a specification.

This invention has relation to seeders of the broad cast type and it consists in the novel construction and arrangement of its parts as hereinafter shown and described.

The object of the invention is to provide a seeder of the character indicated in which a hopper forms a component part with an endless elevator operating along its bottom. Means is provided in the hopper for stirring or agitating the contents thereof and below the delivery end of said conveyer is located a seed spreader adapted to receive the seeds from the said conveyer. Below the said spreader is located a fan which is adapted to spread and blow the seed in a rearward direction as the machine moves in a forward direction. The movable parts of the seeder are operatively connected with the ground or supporting wheels thereof and the parts are so arranged as to economically and effectually accomplish the object sought to be attained.

In the accompanying drawings:—Figure 1 is a top plan view of the seeder. Fig. 2 is a side elevation of the same with one of the ground wheels removed. Fig. 3 is a vertical longitudinal sectional view of the same. Fig. 4 is a rear elevation of the same. Fig. 5 is a detailed perspective view of portions of slats and chains forming component parts of the elevator used in the hopper. Fig. 6 is a transverse sectional view of the same. Fig. 7 is a sectional view of the same cut at a right angle to that upon which the plane of Fig. 6 is cut.

The seeder includes a frame 1 having an axle 2 upon the ends of which are journaled ground or supporting wheels 3. A hopper 5 is mounted upon the frame 1 and is provided with a closed bottom or sump 6 and the rearwardly disposed passage 7. An inclined floor or bottom 8 is located in the passage 7 and is provided in its upper surface with a series of grooves 9 which extend in the line or parallel with the line of draft of the machine. Stirrers 10 are journaled for rotation in the hopper 5 and the shafts of the said stirrers project beyond the sides of the hopper and are provided with intermeshing gear wheels 11. A shaft 12 is journaled for rotation in the sump portion 6 of the hopper 5 and extends transversely across the machine. The end portions of the said shafts 12 project beyond the outer surface of the sides of the hopper 5 and gear wheels 13 are fixed thereto.

Gear wheels or rims 14 are mounted for rotation with the supporting wheels 3 and intermeshed with the gear wheels 13. At the side of each gear wheel 13 is affixed a sprocket wheel 15 which rotates with relation to the axis of the shaft 12 and which rotates with the axis and gear wheels 13. A sprocket wheel 16 is fixed to the shafts of one of the stirrers 10. A shaft 17 is journaled for rotation at the rear portion of the passage 7 and at an elevated position with relation to the shaft 12. Sprocket wheels 18 are fixed to the end portions of the shaft 17 which end portions project beyond the outer surfaces of the sides of the passage 7. A spreader 19 is journaled for rotation below the shaft 17 and the said spreader consists of primarily a shaft 20 which is journaled at its ends in the sides of the passage 7 and which is provided along its intermediate length with a series of radially disposed plates 21. The end portions of the shaft 20 project beyond the planes of the outer surfaces of the passage 7 and are provided with sprocket wheels 22. A fan 23 is journaled for rotation below the spreader 19 and the ends of the shaft of the said fan 23 also project beyond the planes of the outer surfaces of the sides of the passage 7 and are provided with sprocket wheels 24. Sprocket chains 25 pass around the sprocket wheels 15, 16, 18, 22, and 24 and are adapted to move and transmit rotary movement from the gear wheels 13 to the other movable parts of the machine. As has been heretofore indicated the said gear wheels 13 derive rotary movement from the gear wheels or rims 14 carried by the supporting wheels 3 of the machine.

Sprocket wheels 26 are fixed at intervals to the intermediate portion of the shaft 12 in alinement with the grooves 9 while sprocket wheels 27 are fixed at similar intervals to the intermediate portion of the shaft 17 and are also in alinement with the said grooves 9. Chains 28 are mounted for movement upon the sprocket wheels 26 and 27 and at intervals throughout their continuations the said chains 28 are provided with links 29 slightly different in structure from the remaining links serving to make up the said chains. The links 29 are provided at their sides with laterally disposed lugs 30 which are provided with openings 31. Stirrups 32 are secured at their ends in the openings 31 of the lugs 30 and the said stirrups are provided at their opposite sides and in the vicinity of their upper portions with slots 33. Each stirrup is provided upon its under side and in the vicinity of its upper portion with a spring 34. The stirrups upon one chain are in alinement with the stirrups upon the other chains throughout the series of chains transversely with relation to the machine as an entirety and cross slats 35 are seated in the slots 33 of the said stirrups. The springs 34 bear against the upper edges of the slats 35 and serve as securing means for holding the lower edges of the slats in contact with the upper surface of the bottom 8 occurring between the grooves 9 while the springs 34 afford resilient means for holding the said slats down and at the same time will permit the said slats to ride over obstructions or other substances foreign to that which is being sown.

From the above description it is obvious that as the shaft 17 and its attachment rotates the chains 28 will be moved about the said shaft 17 and the shaft 12 and as the upper runs of the chain pass along the grooves 9, the slats 35 will carry the seed up the inclined bottom 8 of the passage 7. When the seeds arrive at the upper or delivering end of the bottom 8 they fall upon the spreader 19 and as the blades 21 of the said spreader rotate about the axis of the shaft 20 thereof the seeds fall from the outer edges of the said blades and are operated upon by a blast of air from the fan 23 which blast blows the seeds in a rearward direction and scatters or spreads broadcast the same. At the same time the agitators 10 within the hopper 5 are rotating upon their axes and the seed contained in bulk in the hopper is prevented from becoming choked therein.

Having described my invention what I claim as new and desire to secure by Letters Patent is:—

1. A seeding machine comprising a wheel mounted frame, a hopper located upon the frame, a conveyer mounted for movement in the hopper, a spreader located below the delivery end of the conveyer, a fan located below the spreader and means operatively connecting the conveyer, the spreader and the fan with the supporting wheels of the machine.

2. A seeder comprising a wheel mounted frame, a hopper located thereon, a conveyer mounted for movement within the hopper, stirrers located within the hopper, a spreader located below the delivery end of the conveyer, a fan located below the spreader and means operatively connecting the conveyer, the spreader the fan and the stirrers with the supporting wheels of the machine.

3. In a seeder as described, a hopper, having a rearwardly disposed passage with an inclined bottom, said bottom having longitudinally disposed grooves, chain belts mounted for movement and having their upper runs located in the grooves and cross slats connecting the belts together and having resilient contact with the upper surface of the said bottom.

In testimony that I claim the foregoing as my own, I have hereto affixed my signature in the presence of two witnesses.

JOHN LOUIS HICKS.

Witnesses:
J. L. WRIGHT,
HALLIE GARNETT.